United States Patent [19]

Schmid

[11] Patent Number: 4,521,143

[45] Date of Patent: Jun. 4, 1985

[54] CRANKSHAFT MILLING APPARATUS

[75] Inventor: Karlheinz Schmid, Neckartenzlingen, Fed. Rep. of Germany

[73] Assignee: Gerbrueder Heller Maschinenfabrik GmbH, Nuertingen, Fed. Rep. of Germany

[21] Appl. No.: 503,698

[22] Filed: Jun. 13, 1983

[30] Foreign Application Priority Data

Jun. 22, 1982 [DE] Fed. Rep. of Germany ....... 3223285

[51] Int. Cl.³ ........................... B23B 5/22; B23C 3/06
[52] U.S. Cl. ................................. 409/200; 51/98 SP; 51/105 SP; 82/9
[58] Field of Search .............. 409/199, 200, 113, 130, 409/131; 82/9; 51/98 SP, 105 SP, 326

[56] References Cited

U.S. PATENT DOCUMENTS

4,337,011 6/1982 Schmid .............................. 409/199

Primary Examiner—Z. R. Bilinsky
Attorney, Agent, or Firm—W. G. Fasse; D. H. Kane, Jr.

[57] ABSTRACT

A crankshaft milling machine has one or more milling units supported on a respective pivot journal (23) having a journal axis extending in parallel to a work piece axis. The pivot journal (23) is supported on a carrier (21) which is movable in a direction parallel to a line connecting the journal axis of the pivot journal (23) and the work piece axis. Thus, it is possible to move the milling unit along a circular path around a crankshaft bearing pin which is to be milled, and which is stationary during the entire milling operation.

11 Claims, 6 Drawing Figures

CRANKSHAFT MILLING APPARATUS

BACKGROUND OF THE INVENTION

The invention relates to a crankshaft milling apparatus having at least one milling unit with internal milling cutter means for the milling of the bearing or crank pins and flanks, especially of the crank bearings of a crankshaft. The milling unit is supported in or on a longitudinal slide which is movable on a longitudinal guide extending in parallel to the direction of the longitudinal axis of a crankshaft work piece. Further, the milling unit is tiltable or rotatable about a journal axis extending in parallel to the longitudinal work piece axis. Due to these features the feed advance movement of the internal milling cutter means takes place along a circular path about the crankshaft bearing pin to be milled. In this type of apparatus the crankshaft work piece is maintained in a stationary position during the milling operation.

Figure 5:
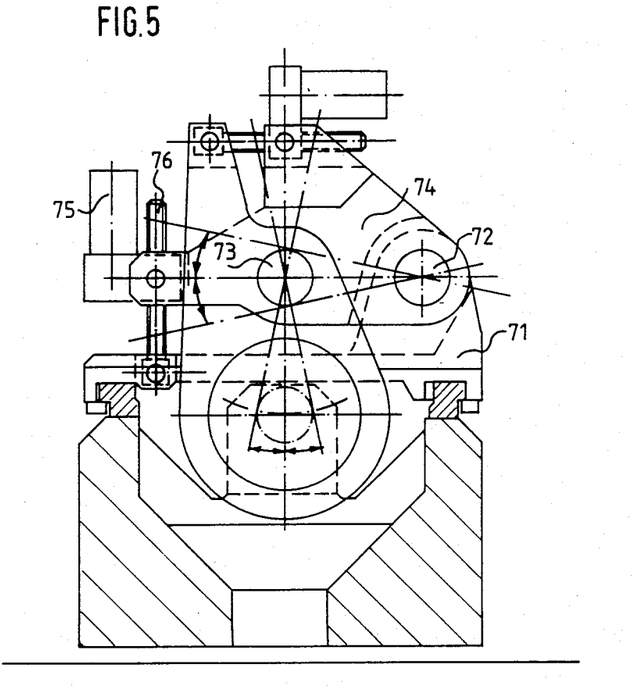
FIG. 5 is a sectional view similar to that of FIG. 1 through a third embodiment of a crankshaft milling machine according to the invention.

German Utility Model Publication (DE-GM) No. 7,106,698 discloses a machine of the just defined type, especially in FIG. 5. In this prior art machine a pivot journal with a circular guide is arranged below the crankshaft work piece. The feed advance drive is installed below the circular guide. The inner milling cutter itself is mounted eccentrically in a circular disk by means of which the inner milling cutter is guided along a circular path around the crank pin to be milled. In this type of prior art milling machine the crank pin or bearing pin to be milled, and thus the crankshaft, were maintained stationary during the milling. However, it has been necessary to rotate the crankshaft between two milling operations in such a manner that the crank pin to be milled takes up a predetermined position. This prior art structure has not been reduced to practice in any commercially feasible way because its assembly did not provide any advantages whatsoever compared to similar prior art structures so that the disadvantages necessarily resulting from the tilting of the milling unit have not been acceptable. Such disadvantages especially involve the displacement of the crank pin center also in the vertical direction when an adjustment had to be made for a different crankshaft stroke.

On the other hand, U.S. Pat. No. 4,337,011 corresponding to German Patent Publication (DE-AS) No. 2,915,662 discloses a crankshaft milling machine in which the work piece is rotating during the milling operation. In such a machine the milling unit is tiltable about a tilting or journal axis extending in parallel to the axis of the work piece. This type of arrangement has solved certain problems successfully. However, it also leaves room for improvement.

Austrian Pat. (AT-PS) No. 286,067 discloses a numerical control for two separate feed advance drives which operate at right angles relative to each other in crankshaft milling machines. Such controls are also useful in connection with the present invention.

German Patent Publication (DE-OS) No. 2,419,554 discloses a crankshaft milling machine in which a slide carrying the milling cutters is guided in parallel to the longitudinal axis of a work piece. Such a slide carries a ring type tool or cutter which rotates around the stationary work piece and the cutting or milling edge of the tool faces radially inwardly. The tool slide is of the so-called cross type comprising two slide members displaceable relative to each in directions extending across the longitudinal work piece axis and at right angles to each other. The relative movements of these two slide members to each other are controlled or coordinated to each other by means of a numerical circular path control. The invention does not require that the two slide members must move at right angles relative to each other.

It is also known that crankshaft milling machines employing radially inwardly effective milling cutters have a number of advantages compared to crankshaft lathe type machines so that recently crankshaft milling machines with inwardly effective milling cutters have been used predominantly. However, since the inwardly effective milling cutter surrounds the tool completely, there are certain stability problems, as well as problems regarding the chip removal or rather problems resulting from the deposition of chips on the guide surfaces on which the milling unit is moving, as compared to older milling machines for crankshafts.

The stability problems are due to the fact that it must be possible to completely withdraw the milling unit from the work piece zone. To achieve this purpose the vise chuck components for holding the work piece were so constructed that the chuck proper was mounted on a neck projecting from the vise in the direction of the work piece axis. For this type of construction it is necessary that the spacing between the chuck proper and the vise is dimensioned corresponding to the extension of the milling unit including the carrier means for carrying the milling unit in the direction of the work piece axis. On the other hand, the vise neck for carrying the chuck must have a diameter as small as possible, in any event it must be smaller than the effective diameter of the inner milling cutter. As a result, it cannot be avoided that such vise neck has only a limited stability. Such limited stability in combination with a relative unstable work piece, such as a crankshaft, required rather expensive supporting features and without such expensive supporting features prior art machines have been limited in their capacity.

It is also known to protect the guides or guide surfaces against falling down chips by cover means. However, such cover means do not remove or solve the basic problem that guide surfaces are present on which falling down chips may be deposited which is undesirable.

OBJECTS OF THE INVENTION

In view of the above it is the aim of the invention to achieve the following objects singly or in combination:

to construct a crankshaft milling machine equipped with inner milling cutters, in such a manner, that the vise neck can be avoided altogether, or that its length can be minimized so that it does not need to be longer than the axial extension of the inner milling cutter itself in the direction of the longitudinal work piece axis less the length of the chuck proper;

to construct such a milling machine in such a manner that chips falling down from the work piece cannot be deposited on any guide surfaces;

to achieve the foregoing objectives even in connection with machines in which the inwardly effective milling cutters are mounted by means of a drum, whereby the extension of the milling cutters includes the extension of the mounting drum;

to make sure that the space needed for the exchange of a work piece is completely accessible;

to provide such an arrangement of components in a crankshaft milling machine employing inwardly effective milling cutters that an effective noise damping may be achieved; and to substantially improve the stability of the components and of the work piece which is stationary during the milling operation.

SUMMARY OF THE INVENTION

The important characterizing features of a crankshaft milling machine according to the invention are seen in that the pivot journal axis or shaft and the corresponding pivoting first feed advance means are arranged laterally or above the work piece. Further, the pivot journal shaft is mounted on carrier means including a second slide. The carrier means are supported on a first slide and a second feed advance between the first and second slide moves the second slide in a plane extending perpendicularly to an axis defined by the work piece and substantially in parallel to a line connecting the axis of the pivot journal and the axis defined by the work piece. All components of the milling unit and all supporting or carrier means for the milling unit including the first longitudinal slide movable in parallel to the work piece axis are located laterally or above the adjacent chucking means. This applies particularly to those components extending beyond the inner milling cutter in the direction of the work piece axis or beyond a drum in which the inner milling cutter is mounted.

According to the invention it is possible that the coordinate axis or directions of the feed advance guide for each milling unit do not extend perpendicularly to each other at all times. These coordinate directions of the feed advance of a milling unit extend perpendicularly to the longitudinal slide movement, but not necessarily perpendicularly to each other. Each milling unit is pivotable or tiltable about a pivot journal axis extending in parallel to the longitudinal work piece axis. As mentioned, this pivot journal and the respective first feed advance are arranged laterally or above the work piece. Advantages of the invention are seen in that the milling unit may be rather narrow in the longitudinal direction of the work piece without impairing the stability because in this way it is possible to provide an additional support for the milling unit, for example, in the form of a circular path guide for the milling unit. Such circular path guide would be located in the respective slide with a radial spacing from the pivot journal axis. The required stability may also be achieved by providing the pivot journal shaft with a substantial axial extension or dimension. Such axial dimension is possible because there is sufficient space due to the position of the pivot journal laterally or above the work piece. Such space is available even without the need for increasing the length or spacing between the two chucking means. In prior art machines it would be necessary to increase the spacing between the chucking means.

Another advantage of the invention is seen in that it is no longer necessary to provide the circular disk for supporting the inner milling cutter excentrically on a circular path around the crank pins to be milled. Accordingly, the corresponding circular guide is also obviated in an apparatus of the invention. The respective drive means for the circular disk are also obviated so that no space is taken up between the chucking means. Yet another advantage of the invention is seen in that the milling unit needs to be moved back for exchanging one work piece for another only to such an extent that the inner milling cutter clears the clamping chuck, whereby the cantilevering of the clamping chuck from the clamping vise may be very small, in fact, the clamping chuck may be directly attached to the clamping vise.

The carrier means for the pivot journal may, according to the invention, be constructed as a vertically displaceable slide which has the advantage that the axial extension or dimension of the milling unit in the zone below the work piece may be shortened to the axial extension of the inner milling cutter in the direction of the longitudinal work piece axis. If the inner cutter is mounted in a drum, this axial dimension of the milling unit can be reduced to the axial extension of the milling drum. This means further that the spacing of the front edge of the clamping chuck from the clamping vise proper also does not need to be larger and that on both sides, that is adjacent to both clamping means. This feature entails a substantial improvement in the stability, especially when the crankshaft milling machine is equipped with two milling units.

In the embodiment in which the drive means for the inner milling cutter means extends through a hollow shaft forming the pivot journal for the milling unit carrier means, an especially advantageous arrangement is achieved because the component which directly supports the inner milling cutter does not need to be equipped for supporting the milling motor and this applies with regard to the space requirement for the motor and also with regard to the strength and stability characteristics needed for the milling motor heretofore. These requirements in this embodiment of the invention may be satisfied at locations where space limitations are hardly of any concern or even non-existent as will be described in more detail below.

An especially light structure or embodiment is achieved when the carrier means for the pivot journal themselves are equipped with a pivot journal.

Another advantage of the invention is seen in that it may employ a first horizontal guide means comprising two rails defining a plane extending either horizontally or vertically. Even in the embodiment with the horizontally extending plane of the two longitudinal first guide rails the arrangement is such that no milling chips may accumulate on the horizontal guide means.

BRIEF FIGURE DESCRIPTION

In order that the invention may be clearly understood, it will now be described by way of example, with reference to the accompanying drawings, wherein.

DETAILED DESCRIPTION OF PREFERRED EXAMPLE EMBODIMENTS AND OF THE BEST MODE OF THE INVENTION

Figure 2:
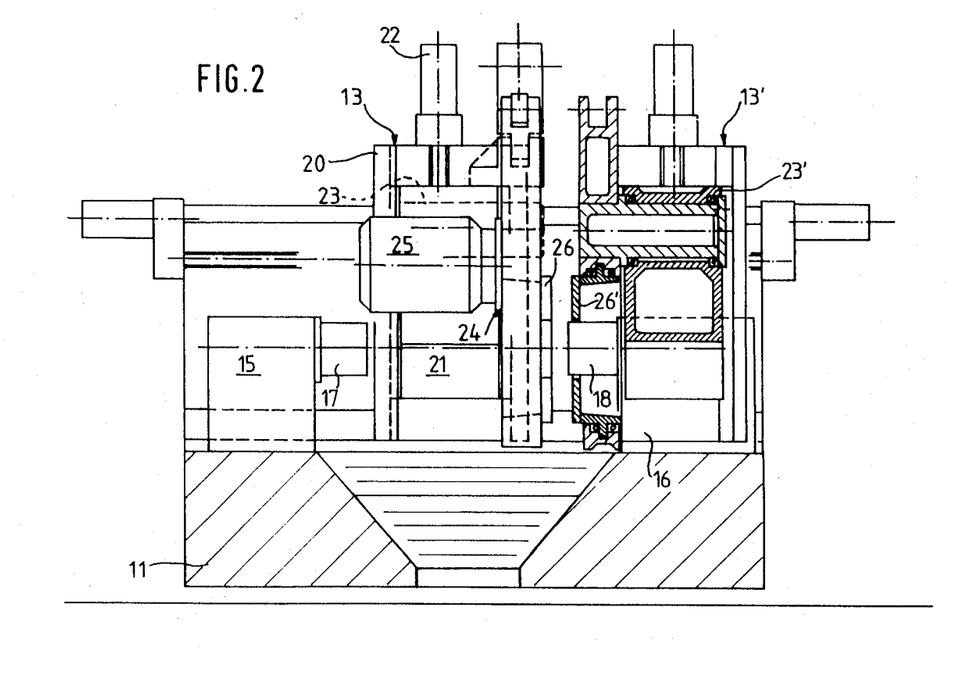
FIG. 2 is a front elevational view, partially in section of the embodiment of FIG. 1.
Figure 4:
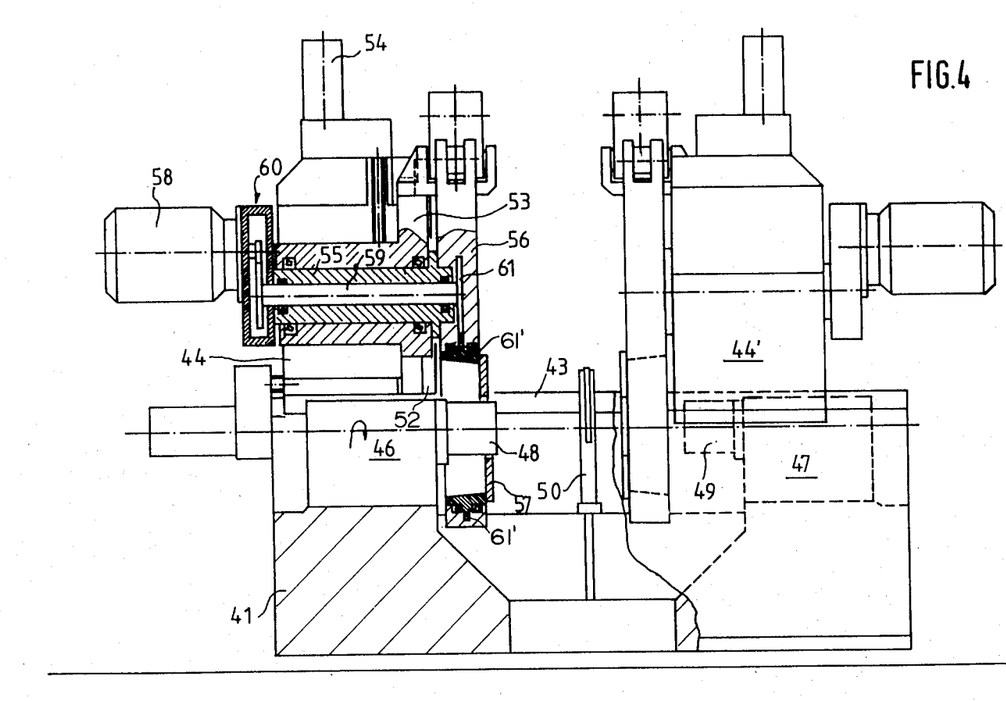
FIG. 4 is a front elevational view of the crankshaft milling machine according to FIG. 3, and also partially in section.
Figure 6:
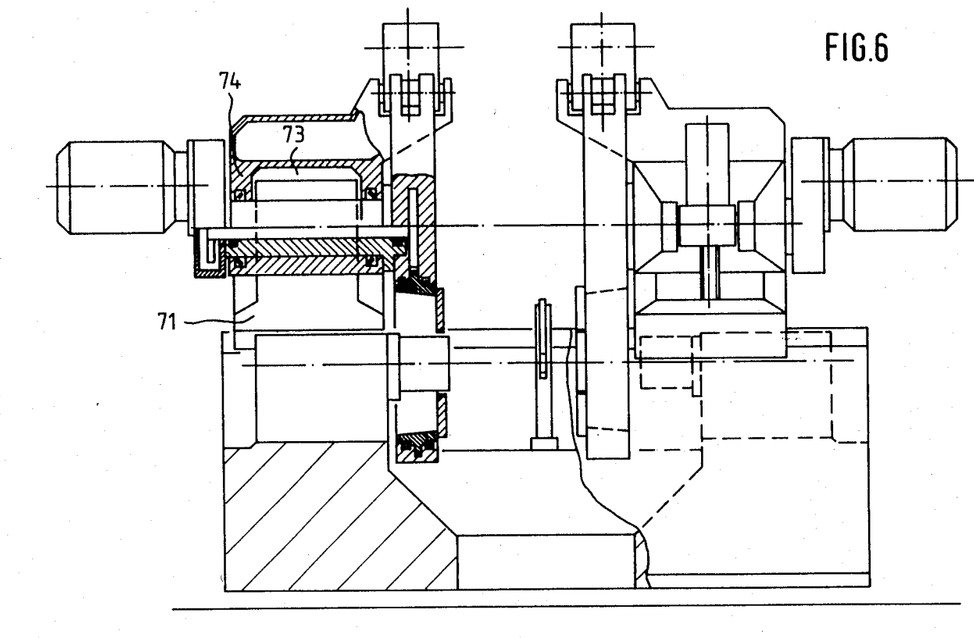
FIG. 6 is a front elevational view partially in section of the crankshaft milling machine according to FIG. 5.

With regard to FIGS. 2, 4 and 6 it should be mentioned that the left and right side portions of the machines are substantially mirror-symmetrical to each other so that describing but one portion should be sufficient.

Figure 1:
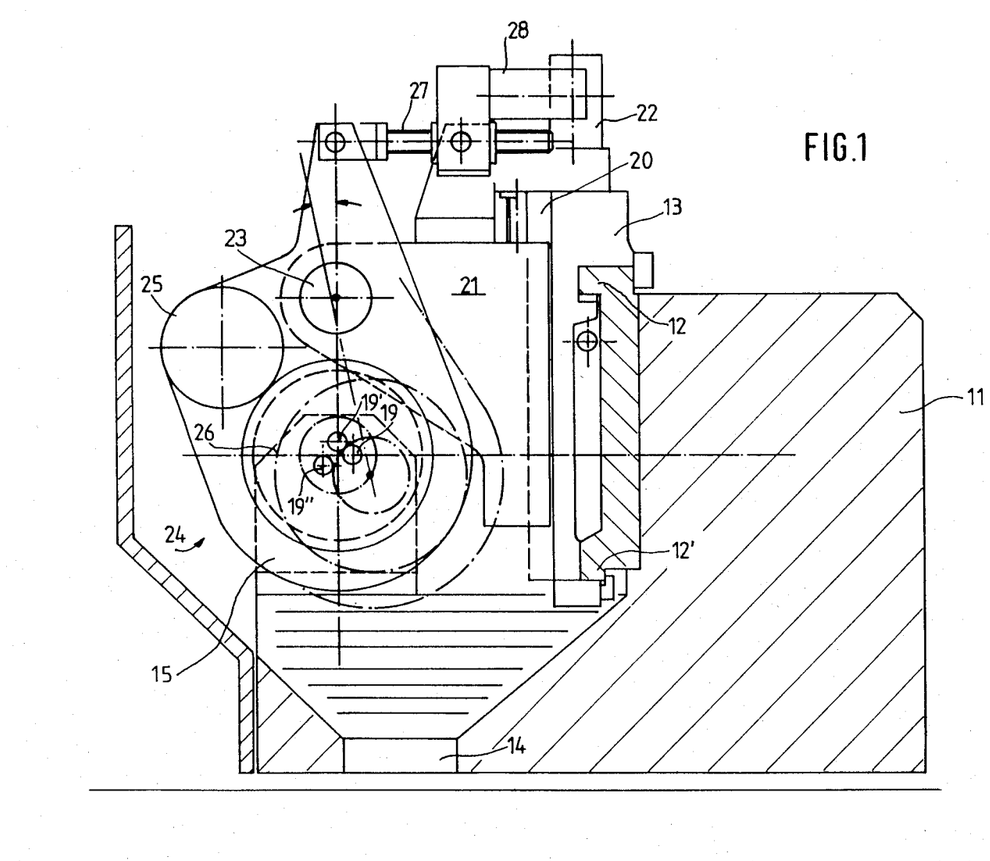
FIG. 1 is a cross-sectional view through a first embodiment of a crankshaft milling machine according to the invention.

Referring to FIGS. 1 and 2, the illustrated crankshaft milling machine comprises a machine bed 11, for example, made of concrete. The machine bed supports two longitudinal guide members 12 and 12' arranged in a vertical plane. A longitudinal slide 13 is horizontally displaceable along these guide members 12 and 12'. A space 14 is provided below the longitudinal slide 13 for accommodating a chip conveyor not shown. The machine bed 11 further carries two vise or clamping members 15 and 16 carrying chucking devices or members 17 and 18 respectively for clamping a crankshaft work piece. To improve the clarity of the illustration, the crankshaft work piece is only shown schematically by three crank pin sections 19, 19', and 19" which are not being machined simultaneously. The crankshaft work piece is clamped in such a manner that it remains stationary during all milling operations even during times when the milling cutter is moved from milling one crank pin into position for milling the next crank pin.

The longitudinal slide 13 in turn carries a second guide means in the form of a vertical guide 20 supporting a vertical slide 21 movable up and down along the vertical guide 20 by means of a feed advance drive 22. A pivot journal 23 is mounted in the upper portion of the vertical slide 21, preferably in a position vertically above the longitudinal work piece axis of the crankshaft as shown in the example embodiment of FIGS. 1 and 2. The milling unit 24 is tiltably supported on the pivot journal 23. The milling unit 24 comprises a milling drive motor 25 and an inwardly effective milling cutter 26 shown only schematically. Above the pivot journal 23 on the side opposite to the inner milling cutter 26 there is arranged an adjustment drive or feed advance drive comprising a ball roller spindle 27 driven by a numerically controlled motor 28 for adjusting the relative angular position of the milling unit 24. The motor 28 is mounted on the upper side of the vertical slide 21.

As is especially clear from FIG. 2, all the components of the milling unit 24, including the vertical slide 21 and the longitudinal slide 13 are located on one side of a plane extending through the inwardly effective milling cutter 26. More specifically, these components are located on that side of the plane which faces toward the clamping vise member 15. Stated differently, these components are located on that side which faces away from the work space and the work piece in the work space when the longitudinal slide 13 is in its rest position, which in FIG. 2 is the leftmost position, whereby the work space is completely accessible and free for the exchange of a work piece.

In the embodiment shown in FIGS. 1 and 2 of the invention a second longitudinal slide 13' is arranged mirror-symmetrically relative to the first slide. The construction of the second slide is the same as that of the first slide 13, except for the fact that both slides are mirror-symmetrical images of each other. Both slides are identical to each other and carry the same structural components so that the second slide 13' does not need to be described. In FIG. 2 the second slide 13' is shown in its rest position. Again, no machine component reaches into the work space between the two clamping chucks 17 and 18. Rather, all machine components project in the direction away from the work space. The respective pivot journal 23 or 23' is located advantageously above the respective clamping vise member 15 or 16 so that it is out of the way in a position above the inwardly effective milling cutter 26 or 26'. The milling motor 25 and its counterpart in the milling unit shown in FIG. 2 on the right side of the machine is located laterally above the clamping vise member 15 or 16 so that the respective milling unit can be advanced into the above described rest position without any problems.

The crankshaft milling machine according to FIGS. 1 and 2 is operated as follows. The slide 13, as seen in FIG. 2, is moved to the leftmost position and the slide 13' is moved into the rightmost position for insertion of a crankshaft work piece. At this time the vertical slide 21 and the milling unit 24 are located in their intermediate or center position so that the inner milling cutter 26 can be advanced over the respective chuck 17 or 18. Any steady rests or so-called back stays that may be provided but are not shown for simplicity's sake are also moved into their respective rest positions as is conventional. In this position of the components the space between the chucking members 17 and 18 is completely free and accessible.

A crankshaft work piece is then clamped in a conventional manner and held in such clamped fixed position so that the crank pins to be milled take up predetermined positions as shown in FIG. 1 by the crank pins 19 and 19' as well as 19" which are displaced in the longitudinal direction extending perpendicularly to the plane of the drawing. It should be noted that the crank pins 19, 19', and 19" are shown symbolically only so that these positions do not actually occur for one and the same crankshaft.

Thereafter, the longitudinal slide 13 is moved to the right while the longitudinal slide 13' is moved to the left until the respective inner milling cutter 26 or 26' is in the proper position for the milling of the corresponding crank pin. The respectively adjacent main bearings of the crankshaft may then also be supported by a conventional steady rest or back stay not shown. Depending on the position of the crank pin to be milled, the milling unit 24 with its milling motor 25 running, is advanced by displacing the vertical slides 21 and/or by tilting about the pivot journal 23 by means of the feed advance drive 27, 28 until it is in the proper position for the respective crankpin to be milled, namely, when the inner diameter of the milling cutter 26 has reached the rated outer diameter of the crank pin. Thereafter, the feed advance drive 22 of the vertical slides 21 and the drive motor 28 of the tilting feed advance are numerically controlled in such a way that the inner milling cutter 26 or 26' revolves along a circular path around the crank pin to be milled, for example crank pin 19. Thus, the invention achieves the desired motion of the inner milling cutter without the need for eccentrically mounting the milling cutter on a circular disk as is described in German Utility Model (DE-GM) No. 7,106,698 mentioned above. A numerical control suitable for two feed advance components extending at right angles to each other and suitable for a crankshaft milling machine as disclosed herein is known from the above mentioned Austrian Pat. (AT-PS) No. 286,067. Thus, a further description of such a feed advance control is not necessary. It should be mentioned, however, that it is not material for the feed advance control whether both feed advance components are linear movements as was the case heretofore or whether tilting movements are employed as disclosed herein for the milling unit 24. Merely the mathematical interrelationship between a digital step of the feed advance drive 22 and a digital step of the other feed advance 28 needs to be correspondingly deduced depending on the type of motion as a linear motion or as a tilting motion.

Figure 3:
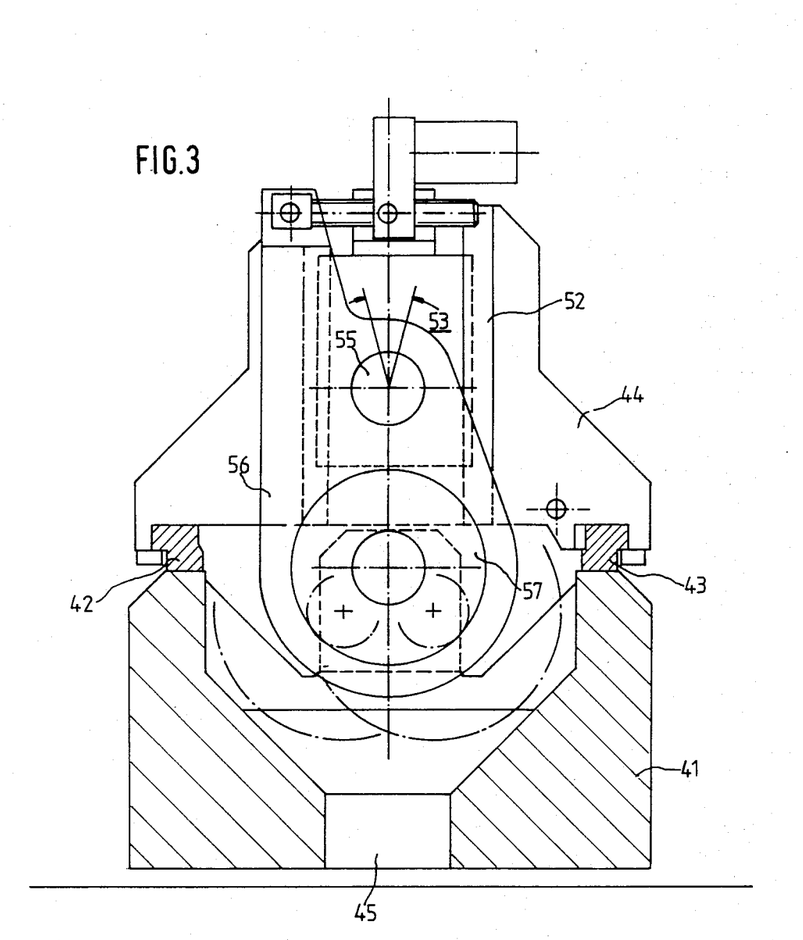
FIG. 3 shows a sectional view through a second embodiment of a crankshaft milling machine according to the invention, whereby the section extends in the same manner as in FIG. 1.

The embodiment shown in FIGS. 3 and 4 discloses a modification relative to the crankshaft milling machine of FIGS. 1 and 2 in that the horizontal guide comprises a horizontal bed 41 having two longitudinal guide rails 42 and 43 spaced horizontally from each other. The longitudinal slide 44 is horizontally displaceable along these guide rails 42 and 43. A space 45 for a chip conveyor not shown is located below the slide 44. Further, the machine bed 41 carries two clamping vise members 46 and 47 each carrying a clamping chuck 48, 49 respectively. The clamping vise members and the chucking members are otherwise identical to those shown in FIGS. 1 and 2. Further, a fixed back stay or steady rest 50 is used in this embodiment as well as a second longitudinal slide 44 which is constructed as a mirror-symmetrical image of the longitudinal slide 44. This corresponds to the feature that in FIGS. 1 and 2 the longitudinal slide 13' is a mirror-symmetrical image of the longitudinal slide 13. The two longitudinal slides 44 and 44' each carry the same elements in a mirror-symmetrical manner as has been described above with reference to FIGS. 1 and 2 so that only the longitudinal slide 44 will be described in the following text.

The longitudinal slide 44 carries a vertical guide 52, the guide plane of which extends vertically, that is perpendicularly, to the horizontal plane defined by the two longitudinal guide rails 42 and 43. This differs from the embodiment of FIGS. 1 and 2. A vertical slide 53 is movable along the vertical guide 52 by means of a feed advance drive 54 for an up and down movement. The vertical guide 52 is of the so-called forced-in or clamped-in type. A further pivot journal 55 is mounted or supported in the vertical slide 52. The pivot journal 55 carries at its one end, seen at the right-hand side of FIG. 4, the milling unit 56 proper having an internally effective milling cutter 57 only shown schematically. The pivot journal 55 carries at its other end, seen at the left-hand side of FIG. 4, a milling cutter drive motor 58. The pivot journal 55 is itself a hollow shaft in which a milling cutter drive shaft 59 is operatively supported in a coaxial manner. The drive motor 58 drives the inner milling cutter 57 through a reduction gear 60, the drive shaft 59 and through a pinion 61. The pinion 61 meshes with a gear rim 61' to which the milling cutter 57 is rigidly secured. The gear rim 61' is supported by bearings as shown in FIG. 4.

In the embodiment of FIGS. 3 and 4 the clamping vise members 46 and 47 are located below the plane defined by the longitudinal guides 42 and 43. Accordingly, a crank shaft not shown held in the respective chucking means carried by the clamping vise members 46 and 47 is also located below the just mentioned plane defined by the longitudinal guides 42 and 43. The inner milling cutter 57 reaches accordingly or correspondingly down while all other components are located above the plane defined by the guides 42 and 43 and thus outside the zone in which any milling chips removed from the work piece may fall down. This type of arrangement is possible if the pivot journal is located above the work piece as described above with reference to FIGS. 1 and 2. This type of arrangement provides the advantages mentioned above with regard to the chip removal and also further advantages which facilitate the damping of noises generated by the operation of the milling machine.

The crankshaft milling apparatus according to FIGS. 3 and 4 is essentially the same as that of FIGS. 1 and 2, except that in FIGS. 3 and 4 it is not necessary to release a back stay when the longitudinal slides 44 or 44' are to be displaced. Accordingly, the back stay also does not need to be displaced and clamped down in a new position. This is so because the back stay 50 in FIGS. 3 and 4 is stationary and needs to be operated only when a work piece is being placed into the machine. This feature provides a substantially improved stability and this has been made possible because the clamping chuck members 48 and 49 now do not need to extend or cantilever more than the dimension of the inner cutter 57 in the longitudinal direction of the work piece axis. Accordingly, a stationary back stay may be employed even in those instances in which heretofore it was necessary to use two or even more back stays in order to counteract the insufficient stability of the entire system. Heretofore, it was necessary to make these back stays adjustable. It will, however, be appreciated, that a stationary back stay may also be employed in the embodiment of FIGS. 1 and 2 so that also in the first described embodiment the just mentioned advantages and simplification of the operation may be achieved.

The crankshaft milling machine according to FIGS. 5 and 6 is essentially of the same construction as that of FIGS. 3 and 4 with one exception. The embodiment of FIGS. 5 and 6 also works in the same way as the embodiment of FIGS. 3 and 4. Therefore, only the exception or difference will now be described. Instead of the vertical guide 52 for a vertical slide 53 the embodiment of FIGS. 5 and 6 carries a longitudinal slide 71 of modified construction. The modified longitudinal slide 71 carries a second pivot journal 72 in the same horizontal plane as the pivot journal 73 which corresponds to the pivot journal 55 in FIGS. 3 and 4. The second pivot journal 72 is horizontally displaced relative to the pivot journal 73, to the right as best seen in FIG. 5. This second pivot journal 72 carries a tilting unit 74 which functions as a carrier for the first pivot journal 73 in the same manner as the vertical slide 53 functions for the pivot journal 55 in FIGS. 3 and 4. The pivot journal 73 is constructed in the same manner and performs the same function as the pivot journal 55 in FIGS. 3 and 4. The tiltable carrier or unit 74 is driven or adjustable by means of a feed advance drive 75 comprising a ball roller spindle 76. This drive is of the same construction as that illustrated with reference to the feed advance 27, 28 of the embodiment of FIGS. 1 and 2. However, the feed advance drive 75, 76 in FIGS. 5 and 6 performs the function of the feed advance drive 22 in FIGS. 1 and 2. Compared to FIGS. 3 and 4, the embodiment of FIGS. 5 and 6 provides for a substantially lighter construction.

Although the invention has been described with reference to specific example embodiments, it will be appreciated, that it is intended to cover all modifications and equivalents within the scope of the appended claims.

What is claimed is:

1. A crankshaft milling apparatus, wherein a crankshaft is stationary during a milling operation, said crankshaft defining a horizontal longitudinal work piece axis, comprising a machine bed, at least one milling unit having inner milling cutter means for milling bearing pins and flanks of a crankshaft work piece, first slide means carrying said at least one milling unit, first guide means supported by said machine bed for guiding said first slide means in its movement in parallel to said work piece axis, carrier means for operatively securing said milling unit to said first slide means, said carrier means comprising second slide means, second guide means on said first slide means for guiding said second slide means in its movement, pivot journal means having a journal axis spaced from said work piece axis and extending in parallel to said work piece axis, said pivot journal means being carried by said second slide means for securing said milling unit to said second slide means, whereby feed advance movements of said inner milling cutter means extend along a circular path around a crankshaft bearing pin to be milled, first feed advance means on said second slide means for rotating said milling unit along said circular path, said pivot journal means and said first feed advance means being arranged on said second slide means relative to said work piece axis, second feed advance means carried by said first slide means and operatively connected to said second slide means for moving said second slide means substantially in a plane extending perpendicularly to said work piece axis and substantially in parallel to a line connecting said journal axis of said pivot journal means and said work piece axis, said apparatus further comprising work piece chucking means supported on said machine bed, and wherein said milling unit and said carrier means for said milling unit have components which project in parallel to the direction of said work piece axis outside of said inner milling cutter means, said components being so arranged that they are located laterally of or above the adjacent chucking means, and wherein said first and second feed advance means cooperate in revolving said milling cutter means along said circular path around the crankpin to be milled.

2. The apparatus of claim 1, further comprising drum means for carrying said milling cutter means, said components projecting outside said drum means being located adjacent to said work piece chucking means.

3. The apparatus of claim 1, wherein said second guide means for said second slide means are vertical guide means, whereby said second slide means are vertically movable up and down by said second drive means and whereby said line connecting said journal axis and said work piece extends substantially vertically.

4. The apparatus of claim 1, further comprising drive means for said inner milling-cutter means carried by said carrier means.

5. The apparatus of claim 4, wherein said pivot journal means comprise a hollow tubular member, said drive means for said inner milling cutter means comprising a motor and first gear means operatively mounted at one end of said hollow tubular member, a milling cutter drive shaft extending coaxially through said hollow tubular member, said first gear means operatively connecting said motor to one end of said drive shaft, second gear means operatively connecting the other end of said drive shaft to said inner milling cutter means for driving said inner milling cutter means.

6. The apparatus of claim 1, wherein said first guide means comprise horizontally extending guide members defining a plane located horizontally above a work piece.

7. The apparatus of claim 1, wherein said first guide means comprise horizontally extending guide members defining a plane located vertically and laterally relative to the work piece.

8. A crankshaft milling apparatus, wherein a crankshaft is stationary during a milling operation, said crankshaft defining a horizontal longitudinal work piece axis, comprising a machine bed, at least one milling unit having inner milling cutter means for milling bearing pins and flanks of a crankshaft work piece, slide means carrying said at least one milling unit, guide means supported by said machine bed for guiding said slide means in its movement in parallel to said work piece axis, carrier means operatively securing said milling unit to said slide means, first pivot journal means having a first journal axis, said carrier means carrying said first pivot journal means for supporting said milling unit in such a position that said first journal axis is located outside said work piece axis, and second pivot journal means having a second journal axis extending in parallel to said work piece axis and in parallel to said first journal axis of said first pivot journal means, said second pivot journal means being carried by said slide means for securing said milling unit to said slide means, whereby feed advance movements of said inner milling cutter means extend along a circular path around a crankshaft bearing pin to be milled, said journal axis of said second pivot journal means being displaced relative to a line extending through said work piece axis and through the first journal axis of said first pivot journal means, first feed advance means for rotating said milling unit along said circular path, said first pivot journal means and said first feed advance means being arranged on said carrier means and spaced relative to said work piece axis, second feed advance means carried by said slide means and operatively connected to said carrier means for pivoting said carrier means substantially in a plane extending perpendicularly to said work piece axis and substantially in parallel to a line connecting said journal axis of said first pivot journal means and said work piece axis, said apparatus further comprising work piece chucking means supported on said machine bed, and wherein said milling unit and said carrier means for said milling unit have components which project in parallel to the direction of said work piece axis outside of said inner milling cutter means, said components being so arranged that they are located laterally of or above the adjacent chucking means, and wherein said first and second feed advance means cooperate in revolving said milling cutter means along said circular path around the crankpin to be milled.

9. The crankshaft milling apparatus of claim 8, further comprising drum means for carrying said inner milling cutter means, said components projecting outside said drum means and being located adjacent to said work piece chucking means.

10. The crankshaft milling apparatus of claim 8, further comprising drive means for said inner milling cutter means carried by said carrier means.

11. The crankshaft milling apparatus of claim 8, wherein said guide means comprise horizontally extending guide members defining a plane located horizontally above said longitudinal work piece axis.

* * * * *